(No Model.)
D. M. WARNER & C. E. HAMMOND.
BRICK TRUCK.
No. 521,196. Patented June 12, 1894.
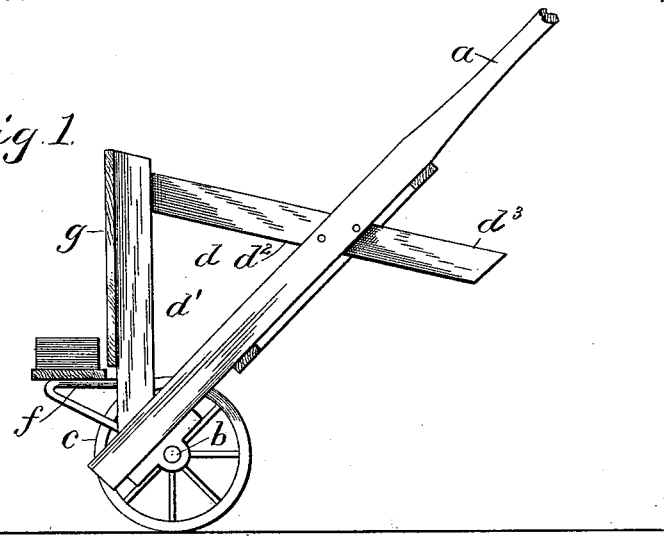
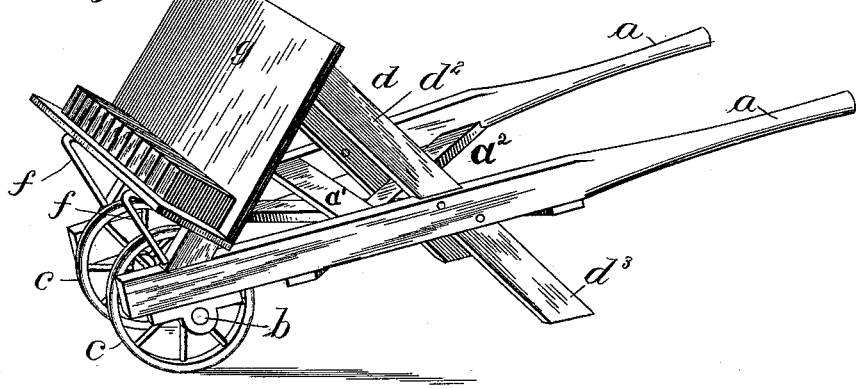
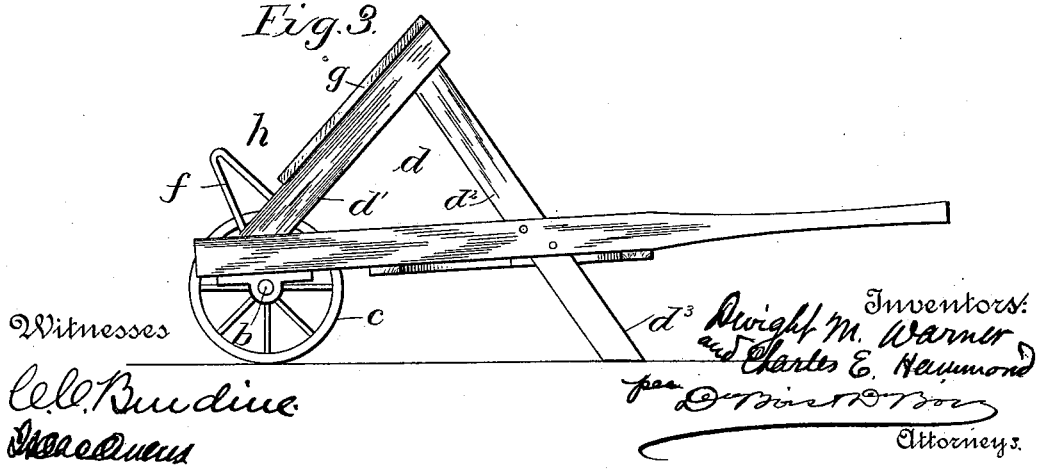

UNITED STATES PATENT OFFICE.

DWIGHT M. WARNER AND CHARLES E. HAMMOND, OF SPARTA, MICHIGAN.

BRICK-TRUCK.

SPECIFICATION forming part of Letters Patent No. 521,196, dated June 12, 1894.

Application filed October 7, 1893. Serial No. 487,525. (No model.)

*To all whom it may concern:*

Be it known that we, DWIGHT M. WARNER and CHARLES E. HAMMOND, citizens of the United States, residing at Sparta, in the county of Kent and State of Michigan, have invented certain new and useful Improvements in Brick-Trucks; and we do declare the following to be a full, clear, and exact description of the invention, such as will enable others skilled in the art to which it appertains to make and use the same, reference being had to the accompanying drawings, and to the letters of reference marked thereon, which form a part of this specification.

The object of our invention is to provide a hand truck for transferring brick, tile, &c., with much greater ease and safety, from the machine which makes them to the drying shed or kiln.

With this object in view our invention consists in a peculiarly constructed truck adapted to be used in conjunction with a movable pallet on which the products of the machine are placed, and on which they remain when deposited in the drying sheds.

In the accompanying drawings, Figure 1 represents a side elevation of the truck tilted forward as in the act of receiving and depositing its load; Fig. 2 a perspective view of the truck in the position it assumes when being wheeled by the workman, and Fig. 3, a side elevation of the truck resting on the ground.

The horizontal portion of the frame is composed of two handle bars $a$, braced and strengthened by cross-bars $a'$ and $a^2$. Between the forward ends of these handle bars is secured an axle $b$, on which two traction wheels $c$ revolve. By having two wheels instead of one, the truck travels much steadier, and reduces the liability of breaking the articles carried. Secured to and rising from the top of the handle bars $a$ is an A-shaped frame $d$, composed of front bars $d'$, and rear bars $d^2$, the latter being extended downward to provide legs $d^3$. At the base of the front bars, $d'$ and over the wheels are located a pair of arms or brackets $f$, which extend downwardly at an angle of about forty-five degrees, and are adapted to receive on them the loaded pallets. Just above these brackets and on the same bars is fastened a wide, flat board or table $g$, against which the load is adapted to recline while in transit. The inclination of this table is about forty-five degrees in relation to the handle bars. The handles of the truck are given such a length in relation to the wheel-axle that when they are lifted while wheeling the truck, the table will assume an inclination which will not allow the bricks to fall forward and off. It will also be observed that the inclination of the table must necessarily be in such relation to the brackets as will permit the latter to be introduced beneath the pallet without pressing against and upsetting the bricks piled thereon. Therefore the upper surfaces of the brackets are constructed to lie in a plane substantially at right angles to the face of the table, a space $h$ being left between the lower edge of the table and the base of the brackets, for the reception of the edge of the pallet during the loading operation.

In using the truck the operator places it in front of a pallet which rests upon cross-beams elevated a sufficient distance above the ground or floor to permit the brackets to assume a horizontal position and to be moved beneath it when the truck is tilted to the position shown in Fig. 1, which position brings the table up against the sides of the brick. Now when the truck handles are lowered the pallet will be tilted backward, and the brick will fall back gracefully and without disturbance onto the table. In this position the load may be wheeled to the drying shed where a reversal of the operation first described will leave the pallet-load of green brick in position to be dried. In this act of transfer the jar of the green brick while in transit is reduced to a minimum, preventing checks, chipping and other injuries heretofore created while the bricks were in transit from the machine to the shed or kiln. In addition to the improved quality of the brick, and the saving of stock from breakage, a great amount of time and labor is also saved by the use of our device.

It is evident that in constructing our device a skilled mechanic could make many little changes which might suggest themselves without departing from the scope of our claims, therefore we do not limit ourselves to the precise construction herein shown, but consider ourselves entitled to all such variations as come within the spirit and scope of our invention.

What we claim as new, and desire to secure by Letters Patent, is—

A brick truck comprising a pair of handle bars having at their forward ends a supporting wheel, a table mounted upon the handle bars and slanting rearwardly at an angle of about forty-five degrees so that when the handle bars are raised the table will extend nearly vertical, and an arm or stud projecting out at right angles from the lower end of the table, upon which arms and table the bricks are adapted to rest in transit, substantially as described.

In testimony whereof we affix our signatures in presence of two witnesses.

DWIGHT M. WARNER.
CHARLES E. HAMMOND.

Witnesses:
A. B. CHENEY,
J. A. SYMES.